United States Patent [19]

Williamson, Jr.

[11] Patent Number: 4,538,021
[45] Date of Patent: Aug. 27, 1985

[54] CABLE CLOSURE HAVING ASYMMETRICAL END PLATE ASSEMBLY

[75] Inventor: Andrew H. Williamson, Jr., Doraville, Ga.

[73] Assignee: AT&T Bell Laboratories, Inc., Murray Hill, N.J.

[21] Appl. No.: 597,688

[22] Filed: Apr. 6, 1984

[51] Int. Cl.³ .................... H02G 5/113; H02G 5/013
[52] U.S. Cl. ........................................ 174/92; 174/93
[58] Field of Search .............. 174/21 R, 22 R, 92, 174/93, 77 R; 292/247, 256.69, DIG. 49

[56] References Cited

U.S. PATENT DOCUMENTS

| Re. 28,468 | 7/1975 | Baumgartner et al. | 174/88 R |
|---|---|---|---|
| 830,182 | 9/1906 | Skov | 292/247 |
| 3,337,681 | 8/1967 | Smith | 174/92 |
| 3,545,773 | 12/1970 | Smith | 174/92 X |
| 3,636,241 | 1/1972 | Baumgartner | 174/92 |
| 3,692,926 | 9/1972 | Smith | 174/92 |
| 3,701,835 | 10/1972 | Eisele et al. | 174/92 X |
| 3,796,823 | 3/1974 | Wright et al. | 174/92 |
| 3,798,349 | 3/1974 | Thompson et al. | 174/92 |
| 3,836,694 | 9/1974 | Kapell | 174/92 X |
| 3,875,325 | 4/1975 | Anderson et al. | 174/92 |
| 3,935,373 | 1/1976 | Smith et al. | 174/77 R |
| 4,103,911 | 8/1978 | Giebel et al. | 174/77 R |
| 4,181,814 | 1/1980 | Smith | 174/92 |
| 4,262,167 | 4/1981 | Bossard et al. | 174/77 R X |
| 4,295,005 | 10/1981 | Daugherty et al. | 174/92 X |
| 4,341,922 | 7/1982 | Bossard et al. | 174/92 |
| 4,350,842 | 9/1982 | Nolf | 174/92 |
| 4,358,634 | 11/1982 | Dienes | 174/92 X |
| 4,361,721 | 11/1982 | Massey | 174/92 |
| 4,362,352 | 12/1982 | Hawkins et al. | 174/94 R |
| 4,376,231 | 3/1983 | Sabia et al. | 174/92 |

FOREIGN PATENT DOCUMENTS 236792  7/1925  United Kingdom ................ 292/247

Primary Examiner—A. T. Grimley
Assistant Examiner—Morris H. Nimmo
Attorney, Agent, or Firm—E. W. Somers

[57] ABSTRACT

A closure (20) for a cable splice includes two mating covers (23, 24) and two end plate assemblies (30—30). Each of two cables to be spliced is wrapped with convolutions of a sealing tape (32) disposed between two washers (34—34). The washers and sealing tape are received in a circular groove (53) formed by mating semi-circular hub portions (54—54) of two halves (42, 44) of an end plate assembly. The end plate assembly has a truncated conical shape with a smaller diameter portion terminating in a hub (52) which is disposed inside the closure. As a result of this conical shape, fasteners (64—64) inside the closure and aligned with the hub are used to secure together the halves of the end plate assembly and apply a balanced force system to the sealing tape within the hub. Longitudinally extending joints between the covers and a circumferential channel (45) in each end plate assembly are each filled with a sealing gasket. The covers are assembled together to enclose the end plate assemblies. Then, the covers are secured together by a plurality of latching fingers (126—126). As the covers are secured together, the longitudinal and circumferential gaskets are caused to seal the joints between the covers and between the covers and the end plate assemblies.

18 Claims, 13 Drawing Figures

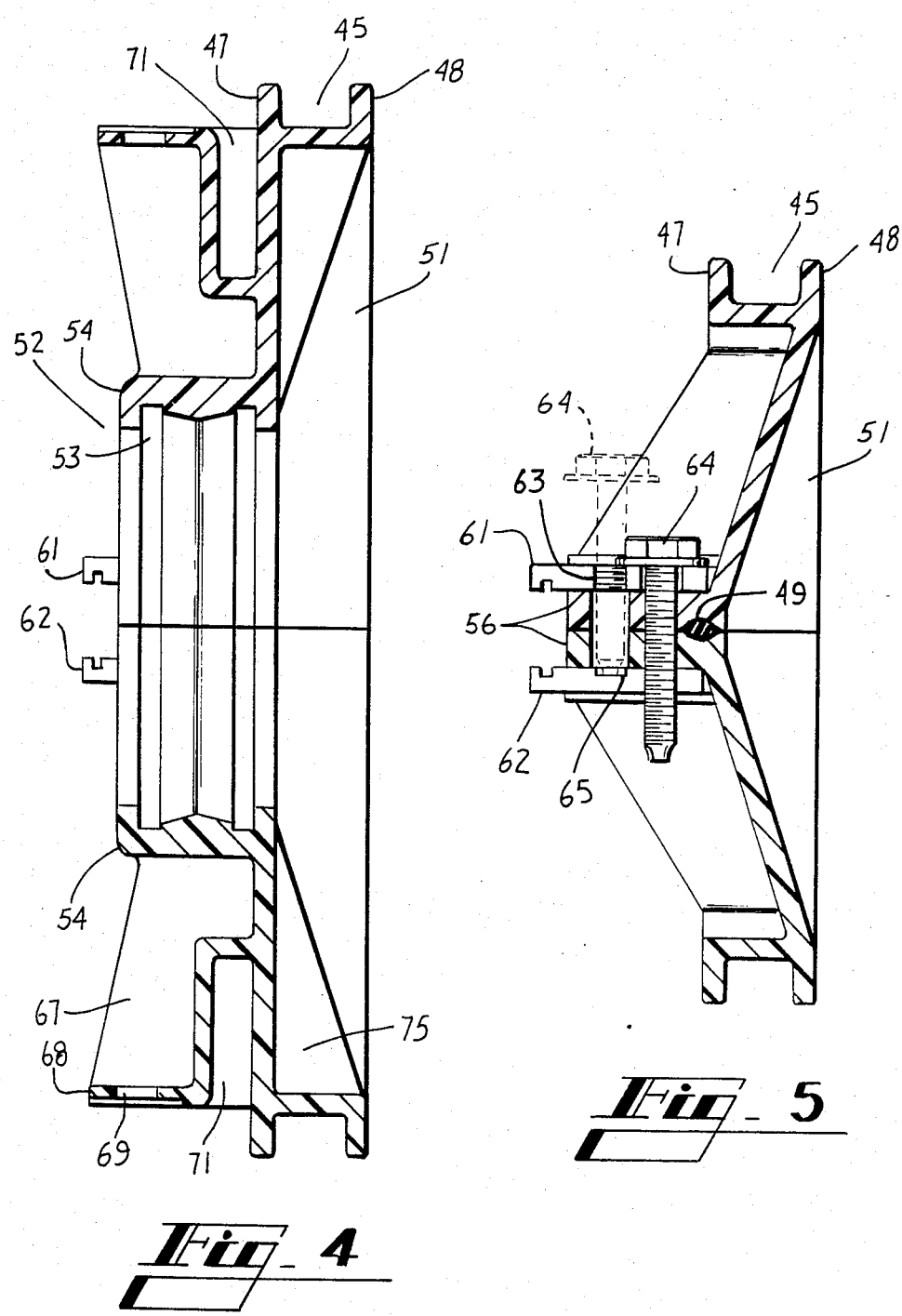
Fig_4
Fig_5

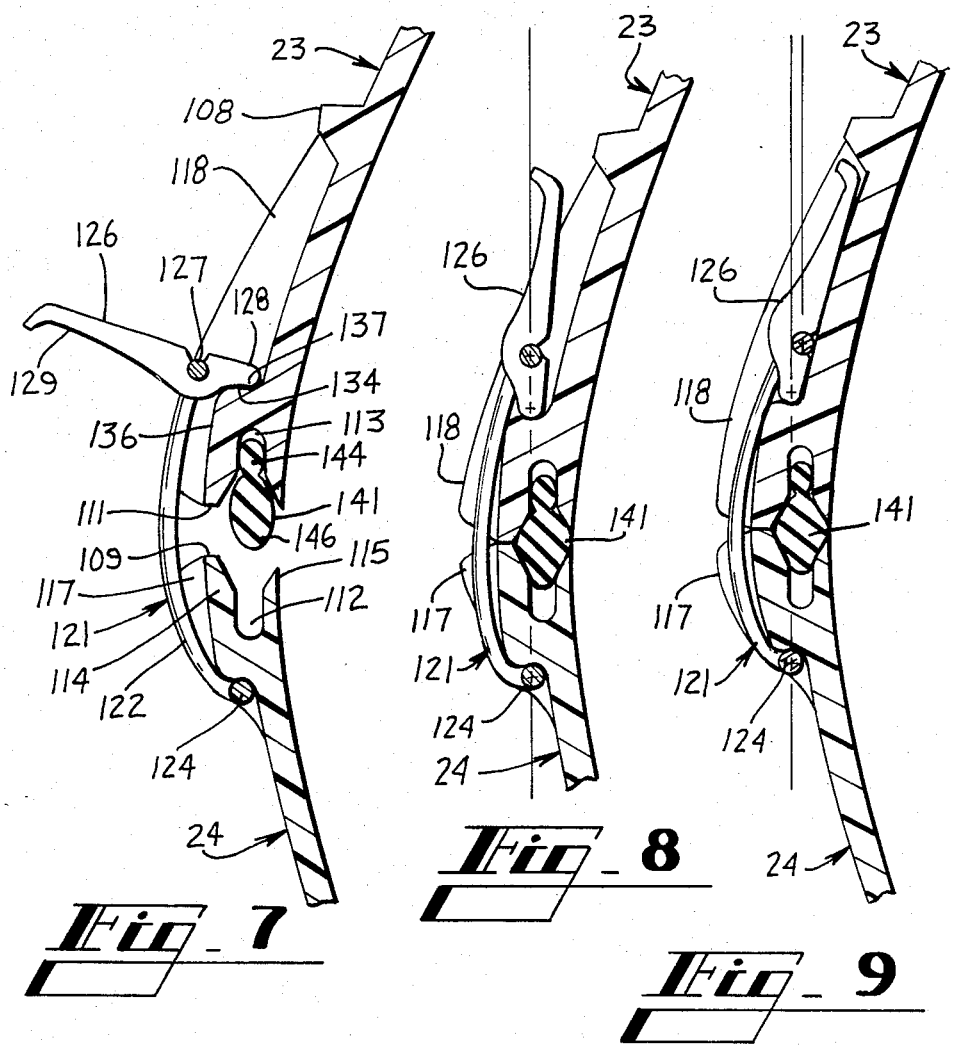

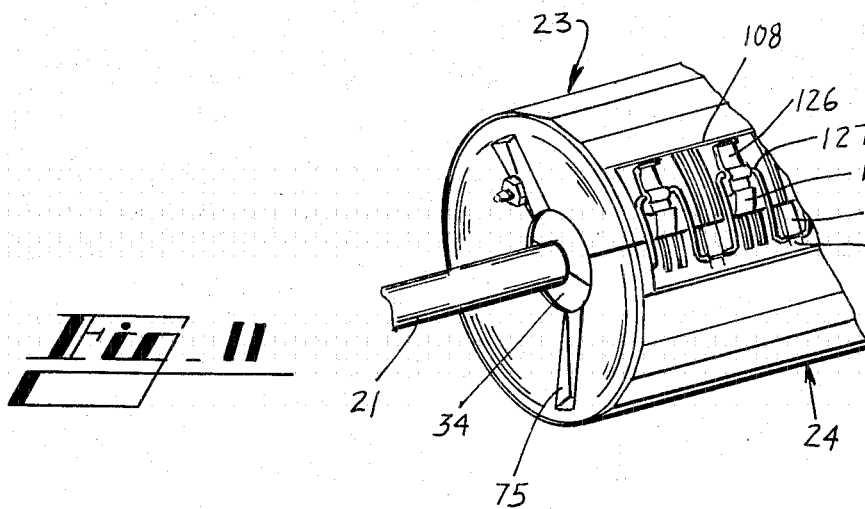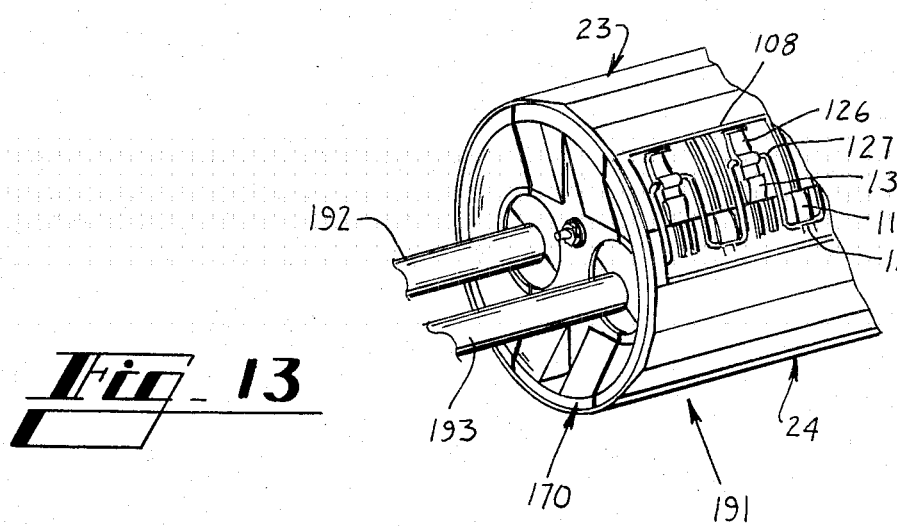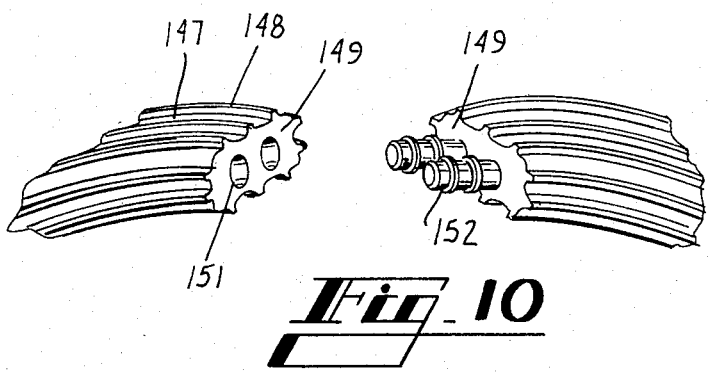

CABLE CLOSURE HAVING ASYMMETRICAL END PLATE ASSEMBLY

TECHNICAL FIELD

This invention relates to a cable closure having an asymmetrical end plate assembly. More particularly, it relates to an end plate assembly of a closure which encloses a cable splice, for example, and which prevents the ingress of moisture and the egress of pressurized gas before and after reentry.

BACKGROUND OF THE INVENTION

Where two ends of a cable such as a telecommunications cable are spliced together, the splice area is ordinarily housed within a protective cover known as a closure. Common to substantially all closures is the requirement that they restrict moisture ingress. The integrity of seals which are used to restrict moisture ingress is important especially because of transmission parameters which are readily effected by changes in the moisture content within the cable. Also, common to most closures is the provision of some degree of cable strain relief to prevent splice separation.

Such closures often have included cylindrical covers with one or more longitudinal joints and end plates that surround incoming and outgoing cables and that form seals with the covers. An example of a prior art closure is shown in U.S. Pat. No. 3,636,241 which issued on Jan. 18, 1972 in the names of R. G. Baumgartner et al. Closures which are effective in providing protection for the splice connections are available in the marketplace, but their assembly is relatively time consuming, often requiring specialized tools and equipment which in a limited space such as an underground tunnel are difficult to handle and operate.

To prevent moisture ingress, some systems employ dry air, nitrogen or a similar chemically inert gas in the cables and closures. In this type of reenterable closure, the gas is pressurized to create a flow from enclosed equipment through any openings and prevent the ingress of moisture. In such a system, it is advantageous to minimize the amount of gas leakage to reduce the consumption of pressurized gas and to insure against any requirement of high gas flow to maintain adequate pressure throughout the system. Accordingly, closures and associated equipment should be sealed sufficiently to prevent a reduction in pressure and the loss of gas. At the same time it is necessary to provide a system which is easily assembled in the field and in which the probability of installer error is relatively low.

Heretofore a number of sealed closure designs have been made available. However, most of these have employed complicated sealing mechanisms which have a high probability of installer error and which consume much time. One major problem with earlier designs has been the need for close tolerances and interference fits. Mechanisms requiring close tolerances and interference fits often are easily damaged in the field where assembly is performed, are expensive to fabricate, and also may require close attention to assembly. These considerations add significantly to both the initial cost of the closure and to the cost of its assembly in the field. Despite their design, such closures may still admit moisture where they are improperly assembled. A closure in which the covers are easily assembled and which provides an effective sealing system with relatively low craft sensitivity is disclosed and claimed in copending commonly assigned application Ser. No. 597,679 which was filed on even date herewith in the name of J. R. Massey.

Although the problems of sealing a closure and of cover assembly have been overcome by the closure of the above-identified application, problems which relate to the end plate remain unsolved. Typically, a cable enters the closure through an opening formed between mating portions which are assembled to form the end plate. As can be seen in U.S. Pat. No. 4,295,005, which issued on Oct. 13, 1981 in the names of E. E. Daugherty et al., the entry of the cable into the closure is sealed by wrapping the cable with a plurality of convolutions of a sealing tape between two retaining washers. The tape and washers are held between end flanges of mating cover portions or are held within the wall of the opening in the end plate through which the cable extends. In one typical symmetrical end plate which comprises two mating portions, fasteners must be applied to each side of the assembled portions to secure them together and to apply a balanced force system to the sealing tape disposed in the opening formed between the two portions. Inasmuch as some of these fasteners are disposed on the outside of the closure, they must be made of a corrosion-resistant material. Other cable entrance designs are available, but they involve complicated molding techniques. For example, in U.S. Pat. No. 4,361,721, each entrance passageway for a cable includes a plurality of longitudinally spaced circumferential ridges. Each ridge is capable of flexing to enlarge the passageway to form a radial seal about a cable being inserted.

Another problem with prior art end plates relates to the strain relief for cables entering the closure. As the outer diameter of the entering cable decreases, the strain relief facilities which may form part of the end plate must extend farther from the end plate in a radial direction to engage the cable. Although some systems which are available in the marketplace provide effective strain relief for large size cables, they have insufficient mechanical strength to span greater distances from their support by the end plate to engagement with a relatively small pair size cable.

The prior art does not seemingly include a relatively inexpensive, reliable closure end plate for use over splices of pressurized communications cables, for example, which allows reentry to the splices and subsequent reassembly. There is still a need for such a closure end plate. Such an end plate is desirable where future changes will be required in the splice connections or where strong possibilities of such changes exist. Further, the end plate assembly should be one which provides an effective seal about the entering cable and and effective strain relief for the cable splice.

SUMMARY OF THE INVENTION

The foregoing problems have been solved by a closure end plate assembly of this invention. The closure which has at least one cable extending thereinto includes first and second aligned end plate assemblies being spaced apart with at least one end plate assembly having at least one opening therein to allow the at least one cable to extend therethrough. First and second covers are assembled together about the end plate assemblies to enclose the at least one cable which extends through at least one end plate assembly. Each of the end plate assemblies comprises mating portions which are assembled together to form a peripheral flanged portion connected to a wall which converges inwardly toward the interior of the closure and which terminates adjacent to a hub which is offset from the flanged portion along a longitudinal axis of the closure. Each hub is disposed within the closure with a cable extending through an opening in at least one hub. Means aligned with the hub in a plane normal to the longitudinal axis of the housing and disposed within the closure apply balanced forces to the mating portions of each said end plate assembly to secure together the portions and to maintain each pub having a cable extending therethrough in compliant engagement with a sealing material which is disposed about the cable within the hub opening. The closure also includes securing means including pivotally moveable means for applying forces to the covers to cause longitudinally extending and circumferential gaskets to provide seals.

In a preferred embodiment, the closure includes a first cover portion and a second cover portion which is adapted to be assembled with the first cover portion to form two longitudinally extending joints. A reuseable gasket is disposed in each of the longitudinally extending joints, the gaskets being made of a material which is compliant with the material of the cover portions. The closure also includes first and second conically shaped end plate assemblies which are disposed at opposite ends of the cover portions with the first and second cover portions enclosing the peripheries of the end plates. Fasteners which are used to secure together the mating portions of each end plate assembly are disposed within the closure adjacent to and aligned with a hub that has a channel for receiving washers and sealing tape disposed about each entering cable. As a result, the fasteners apply balanced forces to the aligned hub and hence to the sealing tape. The fasteners extend through bearing plates which also function to provide a guideway for a clamp that engages the cable jacket. A reuseable gasket is disposed about the periphery of each said end plate assembly in the joint formed between the end plate assembly and the cover portions which enclose the peripheries of the end plate assemblies. The gasket about each end plate assembly is adjacent to the longitudinal gasket at each confluence of a longitudinally extending joint and the periphery of one of the end plate assemblies. Facilities also are provided for applying forces to the cover portions to compress the longitudinal gaskets to provide longitudinally extending seals. Also, these forces cause portions of each circumferential and longitudinal gasket at each confluence of the cover portions and an end plate assembly to protrude slightly into sealing engagement with each other.

BRIEF DESCRIPTION OF THE DRAWINGS

Other features of the present invention will be more readily understood from the following detailed description of specific embodiments thereof when read in conjunction with the accompanying drawings, in which:

FIG. 4 is an elevational view in section of the end plate assembly of FIG. 3 as taken along lines 4—4 thereof;

FIG. 5 is an elevational view in section of the end plate assembly of FIG. 3 as taken along lines 5—5 thereof;

FIGS. 7-9 are a sequence of views which shows the steps in the actuation of a latching system for securing together the cover portions of the closure;

FIG. 10 is a perspective view of a circumferential gasket and of a joint between portions of the circumferential gasket;

FIG. 11 is a perspective view of a portion of the closure with the latching system having been actuated;

FIG. 13 is a perspective view of the end plate assembly of FIG. 12 with two cables extending therethrough and with a latching system shown in an actuated position.

DETAILED DESCRIPTION

Figure 1:
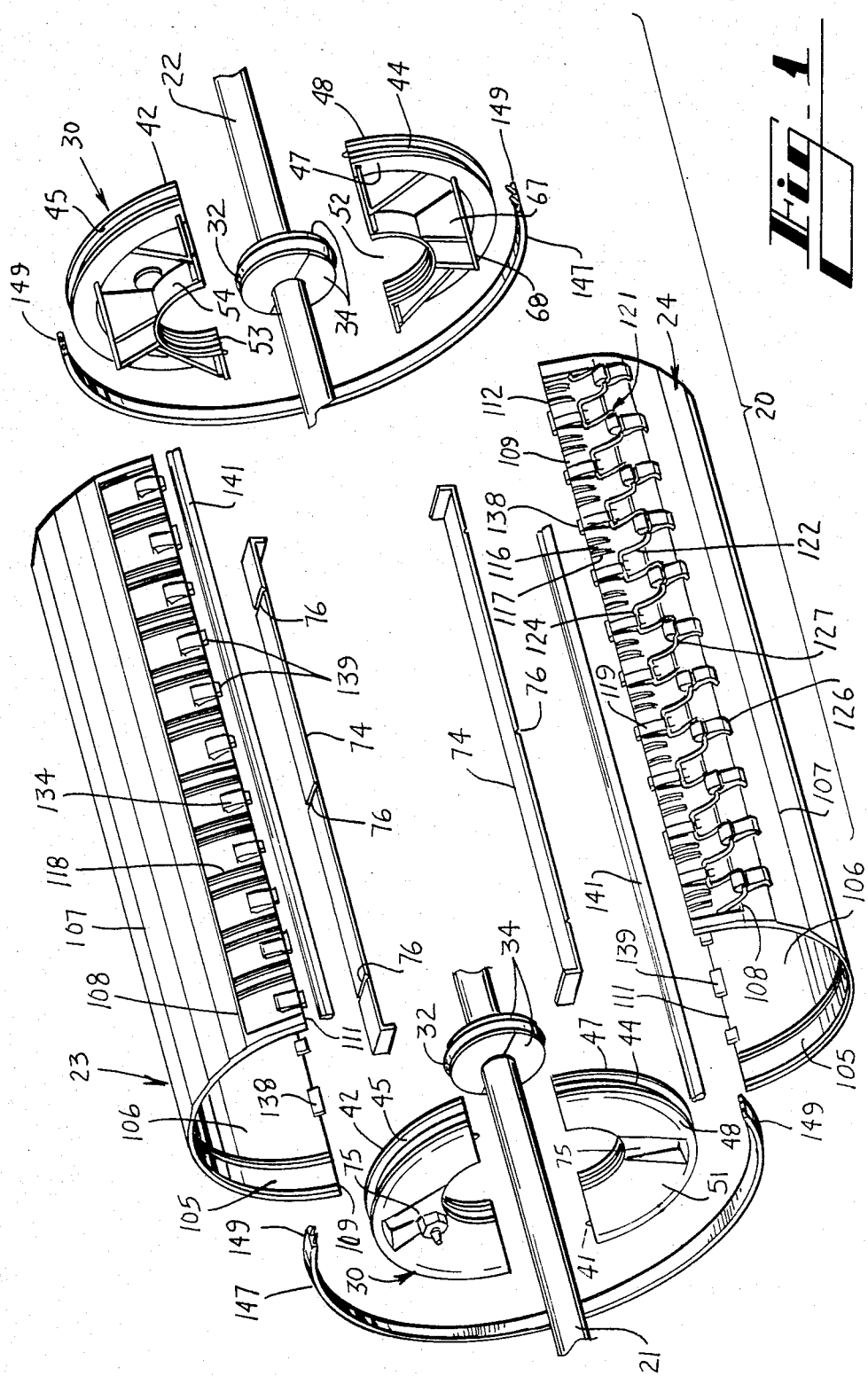
FIG. 1 is an overall exploded perspective view of a closure which includes two cover portions and two end plate assemblies of this invention with two cables extending into the closure.

Referring now to FIG. 1, there is shown a closure which is designated generally by the numeral 20. The closure 20 is used to enclose a portion of a cable to which are spliced conductors or a splice of two cables 21 and 22 in order to prevent the ingress of moisture which could affect adversely the transmission characteristics of the cable. The closure 20 is such that it provides a seal about the cable or cables which extend thereinto and seals between components thereof which are assembled. Further, the closure 20 is such that it is reenterable and that its component portions are capable of being reassembled easily with the seals being reuseable.

The closure 20 includes a pair of covers which are referred to as first and second covers and which are designated generally by the numerals 23 and 24. Each of the covers has a generally semi-circular cross section and a generally uniform thickness. The covers 23 and 24 are adapted to be assembled together with end plate assemblies 30—30 through which the cables extend to form a generally cylindrical closure. The covers 23 and 24 are made of a glass-mat reinforced polypropylene plastic material and the end plate assemblies 30—30 are injection molded glass-filled polypropylene.

The preferred embodiment will be described in terms of a closure 20 into which two cables extend for splicing. The cable 21 extends into the closure through one of the end plate assemblies 30—30 and the other cable 22 through the other end plate assembly. In the field, a craftsperson assembles an end plate assembly 30 to one of the cables to be spliced and another end plate assembly to the other cable. Then the craftsperson assembles the covers 23 and 24 about the end plate assemblies 30—30.

Prior to assembling an end plate assembly 30 to a cable, the cable must be prepared. A sealing tape 32 is wrapped in a plurality of convolutions about the cable between two retaining washers 34—34 which are adapted to be received in an opening formed through the end plate assembly 30. In a preferred embodiment, the sealing tape is one designated B sealing tape, which comprises carbon black, polybutene and butyl rubber and which is manufactured by RuVan Inc, for example.

A grommet which is made of a polyurethene material can be used in place of the sealing tape 32.

The end plate assemblies 30—30 are shown in FIGS. 1-5. Each end plate assembly 30 is comprised of two substantially identical portions 42 and 44. Each of the portions 42 and 44 includes diametrically opposed troughs 43—43 in a surface 46 (see FIG. 6) along which the portions are mated. The portions 42 and 44 each have a tapered lug 41 extending from one side of the surface 46 and a depression in an opposite side to assist in mating the portions. Also, each portion 42 and 44 includes a circumferential channel 45 which includes spaced flanges 47 and 48 and which communicates with the troughs 43—43. The troughs 43—43 are designed to receive a sealing member 49 (see FIG. 2) which may be made of the same material as the tape 32 and which prior to assembly of the portions 42 and 44 has a generally circular cross-section.

The flange 48 is formed integrally with a wall 51 which converges inwardly (see FIG. 1) toward the interior of the closure. More particularly, the wall 51 provided by the assembled portions 42 and 44 forms a truncated cone. This is done in order for the end plates to be able to withstand better the pressure inside the closure. Also, this configuration allows the wall 51 to be made with a substantially uniform thickness which is preferable from an injection molding standpoint.

Figure 2:
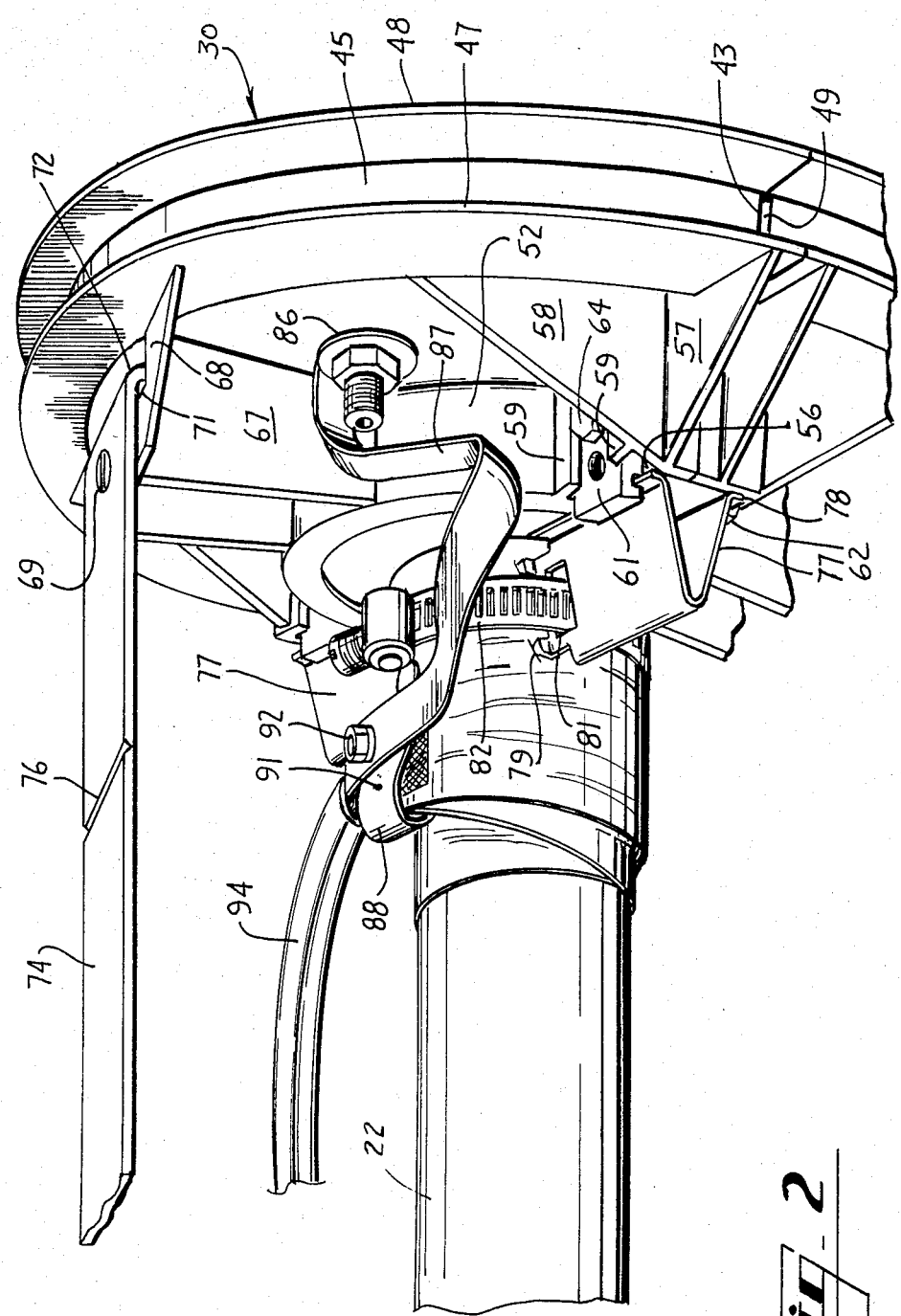
FIG. 2 is a detailed view of the end plate assembly of this invention which shows cable securing facilities and a longitudinally extending tie bar.
Figure 3:
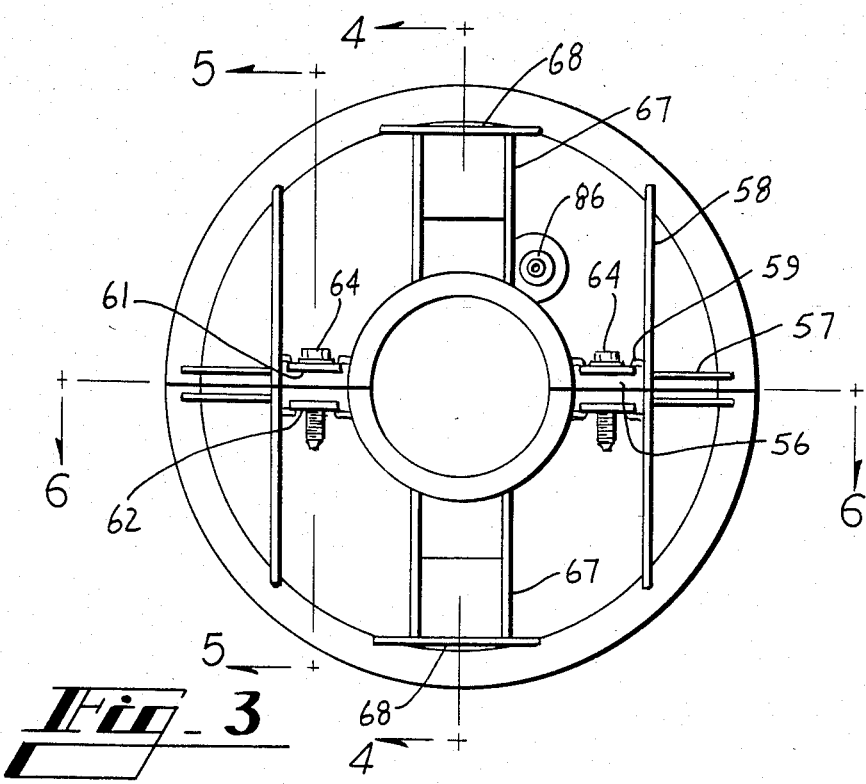
FIG. 3 is an elevational view of the end plate assembly of the closure of FIG. 1.

As can be seen in FIGS. 1, 2 and 4, the wall 51 formed by the end plate portions 42 and 44 terminates adjacent to a circular cable engagement portion 52 in the form of a hub. The hub 52 is comprised of two semi-circular hub portions 54—54 each being formed with one of the portions 44 and 42 and each being provided with a groove 53. As can be seen in FIGS. 2 and 4, the hub 52 is disposed within the closure 20 and is offset from the flanges 47 and 48 in a direction along a longitudinal axis of the closure. Further, a portion of the groove 53 which communicates with the troughs 43—43 is formed to have a triangularly shaped cross-section. The taped portion of the cable and the retaining washers are received between opposite walls of the groove 53. The triangular shape of the bed of the groove enhances the seal between the taped portion of the cable and the hub 52.

Further, adjacent to each of diametrically opposed ends of each portion 54 is formed a shelf 56 braced by stiffeners 57—57 and 58—58. The stiffeners also help in preventing the wall 51 from bowing outwardly when the closure is pressurized. A guideway is formed on each shelf 56 by portions 59—59 which overhang and secure metallic bearing plates 61 and 62. When the end plate portions 42 and 44 are assembled together, holes in the plates 61 and 62 become aligned with each other and with holes through the shelves 56—56. Fasteners 64—64 are inserted through clearance holes in the plates 61—61 and turned into engagement with threaded holes in the bearing plates 62—62 to secure together the portions 42 and 44.

It should be observed that the fasteners 64—64 are disposed in a plane which extends through the hub 52. As a result, the fasteners apply balanced forces to the hub to compress the sealing tape which is wrapped about the cable. But for this alignment, bolts may be required on both the internal and external sides of the end plate assembly. This, of course, would require that the bolts external to the closure be made of a corrosion-resistant material. Further, it should be pointed out that this alignment is made possible because of the converging wall of the end plate assembly.

It should be observed from FIG. 5 that a threaded hole 63 in the bearing plate 61 is aligned with a blind hole 65 in the bearing plate 62. When it is desired to remove the end plate portions 42 and 44 from engagement with a cable, a craftsperson turns fasteners through threaded holes 63—63 in the bearing plates 61—61 into the blind holes 65—65. As the fasteners are turned further, forces are applied to cause a separation of the portions 42 and 44.

Extending radially from the center of each of the cable engagement portions 54—54 are facilities for holding an end of the alignment bar. Spaced ribs 67—67 support a platform 68 having an aperture 69 therein (see FIGS. 2 and 4). Between the platform 68 and the flange of each portion 42 and 44 is formed a slot 71. The slot 71 is designed to receive a downturned end 72 of an alignment bar 74 which extends from one end plate to the other.

As can be seen in FIG. 1, the alignment bar 74 has notches 76—76 spaced therealong. These notches act as a gauge so that the craftsperson knows the length of jacket to be removed from the cable.

Also, as can be seen in FIG. 4, aligned with each slot 71 is a well 75 formed in the exterior of the end plate. This causes a portion of the flange to be exposed and allows a U-shaped clip (not shown) to be moved over the flange and the covers 23 and 24 to hold the covers in engagement with the end plate assemblies 30—30 preparatory to the securing of the covers.

The closure 20 also includes provisions for gripping the jacket of each cable which extends through an end plate assembly. Each end plate assembly 30 includes a pair of jaw-tooth clamps (see again FIG. 2) each having a generally V-shaped cross section defined by legs 77—77 and flanges 78—78. One end of each leg is formed with teeth 79—79 which become embedded in the cable jacket when the clamps are mounted on the end plate. The toothed end of each leg also is formed with a slot 81 which is adapted to have a hose clamp 82 passed therethrough. The V-shaped cross-section provides a high strength sheath clamp which retains its shape notwithstanding a relatively long cantilevered portion to engage a relatively small pair size cable.

As can be seen in FIG. 2, each cable clamp is mounted on shelves 56—56 with the flanges 78—78 being received under the overhanging portions of the plates 61 and 62. The fasteners 64—64 are turned to fasten together the end plate sections. Then, the clamps are moved slidably along the shelves until the teeth 79—79 become embedded in the cable jacket. A hose clamp 82 is passed through the slots 81—81 of the clamps of each end plate assembly about the cable extending therethrough and tightened.

Each end plate assembly 30 also may be provided with a valve adapter 86 (see FIG. 2) which provides access to the interior of the closure 20 for introducing pressurized gas and which comprises part of a grounding system for the closure. Further, as can be seen in FIG. 2, provisions are made in the closure 20 for carrying electrical continuity across the splice. This is accomplished by providing a strap 87 to a bond clamp 88 such as that shown in U.S. Pat. No. Re. 28,468 issued July 8, 1975 in the names of R. G. Baumgartner and H. J. Graff. A portion of the bond clamp 88 is positioned in engagement with a metallic shield of the cable and another portion 91 is clamped to the outer jacket through a threaded stud 92. A braided conductor 94 is attached to the threaded studs at opposite ends of the closure to carry electrical continuity from one cable to the other.

As can be seen in FIG. 1, each cover 23 and 24 includes a channel 105 formed about an inner surface 106 thereof at each of its ends. When the covers 23 and 24 are assembled together, the semi-circular channels at each end form a circular channel which is adapted to receive an end plate assembly 30 of the closure.

Each cover 23 and 24 is such that its outer surface is formed by a plurality of relatively short segments. As a result, the outer surface of each cover exhibits a plurality of parallel lines 107—107 (see FIG. 1). Further, each cover includes a rib 108 which extends longitudinally along the cover a relatively short distance from each of its longitudinal edges 109 and 111. The longitudinal edges 109 and 111 are formed to include longitudinally extending grooves 112 and 113, respectively (see FIG. 7). An outer wall 114 which defines the groove extends past an inner wall 115.

The closure 20 includes facilities for securing together the covers 23 and 24 (see FIGS. 1 and 7). Each cover 23 and 24 also includes a plurality of separators 116—116 along the one edge 109 and a plurality of separators 118—118 along the other edge 111. Each of the separators 116—116 includes a pair of spaced ears 117—117 which project outwardly from the cover. Between separators 116—116 is formed a seat 119. The separators 116—116 and the seats 119—119 are adapted to receive a continuous wire latch support frame 121 which includes a plurality of U-shaped portions 122—122. Further, as can be seen in FIG. 7, the U-shaped portions 122—122 of the wire latch support frame 121 are shaped arcuately.

One wire latch support frame 121 is attached to the one longitudinal edge portion 109 of each cover 23 and 24. Each of a plurality of spaced colinear portions 124—124 of the wire latch support are snap-locked to associated ones of the seats 119—119. The snap-locking is accomplished so that the entire wire support frame is capable of being moved pivotally.

The wire latch support frame 121 also is provided with a plurality of latching fingers 126—126 which are made of a plastic material such as polypropylene. Each latching finger is mounted on one of a plurality of spaced colinear wire portions 127—127 which are parallel to the wire portions 124—124. Each wire portion 127 functions as a fulcrum about which its associated latching finger 126 moves pivotally. As can be seen best in FIG. 7, each latching finger 126 includes one end portion 128 and another longer, end portion 129. The end portion 128 cooperates with portions of the mating cover whereas the end portion 129 is used by a craftsperson as a lever to turn pivotally the latching finger 126 and to seat the end portion 128.

When the covers are assembled together, the separators 116—116 and seats 119—119 along the longitudinal edge portion 109 of each cover become disposed adjacent to an arrangement of separators and seats along the adjacent longitudinal edge portion 111 of the other cover.

Viewing now FIG. 1, it can be seen that the other longitudinal edge portion 111 of each cover 23 and 24 is formed to include the plurality of pairs of separators 118—118. Each of the separators 118—118, unlike a separator 116, extends to the adjacent rib 108. The longitudinal edge portion 111 also includes a plurality of seats 134—134 which alternate with the pairs of separators. The seats 134—134 are such that one portion 136 (see FIG. 7) of each is substantially tangential to the joint formed between the two covers when they are assembled. Another portion 137 of each seat 134 angles inwardly generally toward a longitudinal centerline of the closure 20.

The latching arrangement is referred to as an over-center latching arrangement. As each lever portion 129 is turned, it passes through a center position (see FIG. 8) in which its fulcrum 127 is aligned with the portion 137 of the seat 134 to which it will be locked and the portion 124. In this position, it applies maximum compressive forces to the covers 23 and 24. However, in that position, the latching finger 126 is in an unstable or bistable condition and could move in either rotary direction. If it moved outwardly, then it would become loose and would not secure together the covers 23 and 24. Therefore, to secure the covers 23 and 24, the end 129 of each latching finger 126 must be moved toward the closure to engage the cover 23 and firmly seat its end 128 in engagement with its associated seat 134 (see FIG. 9).

The covers 23 and 24 also include provisions for locating the covers longitudinally with respect to each other. The longitudinal edge portions 109 and 111 of each cover include a plurality of depending teeth 138 and 139 (see FIG. 1) with the teeth 139 being offset longitudinally from the teeth 138. When the two covers are brought together, the teeth 138 of the cover 23 become interdigitated with the teeth 139 of the cover 24. Also, the teeth 138 of the cover 24 become interdigitated with the teeth 139 of the cover 23. These teeth assist in the longitudinal and transverse orientation of the covers 23 and 24 during assembly.

Figure 6:
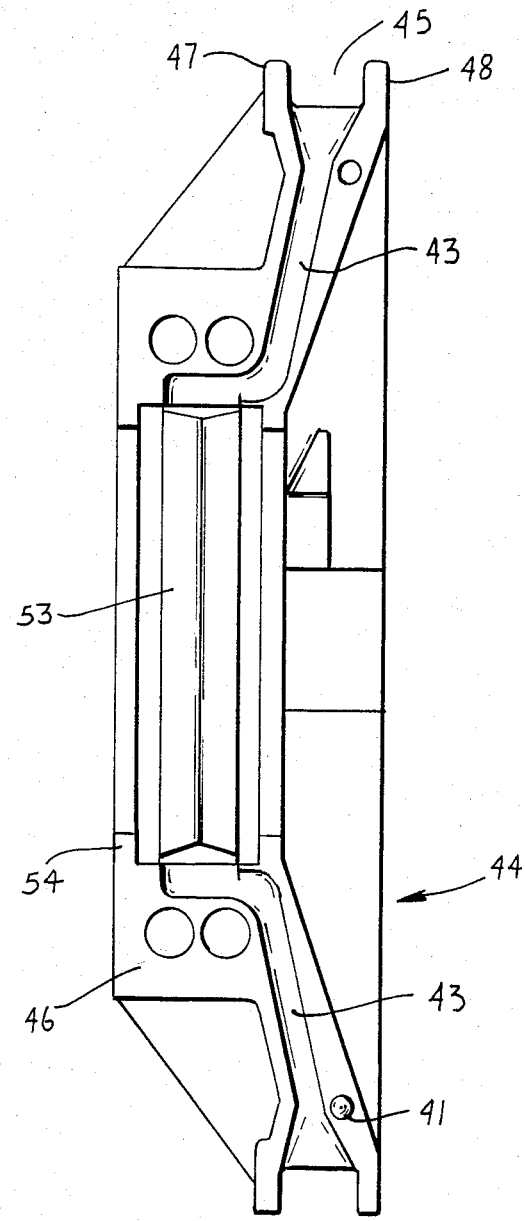
FIG. 6 is a view of one portion of the end plate assembly of FIG. 3 as taken along lines 6—6 thereof.

The end plate assemblies 30—30 are assembled to the cables 21 and 22 with sealing elements 49—49, which comprise a portion of a sealing system for the closure 20, being positioned in the troughs 43—43 (see FIGS. 2 and 6). The alignment bars 74—74 are connected to the end plate assemblies 30—30. Also, the alignment bars 74—74 which have their downturned ends received in the slots of the end plate assemblies assist the craftsperson in aligning the end plate assemblies and in maintaining their position prior to assembly of the cover 23 with the cover 24. Afterwards, the covers 23 and 24 are assembled to the end plate assemblies 30—30.

Prior to the assembly of the covers 23 and 24 to each other and to the end plate assemblies 30—30, remaining elements of the sealing system are introduced into the closure. The sealing system induces a pair of longitudinally extending gaskets 141—141 (see FIGS. 1 and 7). Each of the gaskets 141—141 includes a head portion 144 and a body portion 146. The gaskets 141—141 are positioned in the longitudinally extending grooves of the covers 23 or 24.

Then each of a pair of circumferential gaskets 147—147 (see FIG. 10) having longitudinally extending ribs 148—148 is positioned in one of the channels 45—45 of each end plate assembly 30 (see FIG. 1). In a preferred embodiment, the gaskets 141—141 and 147—147 are made of a silicone rubber material.

Ends 149—149 of each circumferential gasket 147 are connected together. This is accomplished, for example, by forming each circumferential gasket with a pair of longitudinally extending passageways 151—151. At the junction of the ends of the gasket 147, pins 152—152 are positioned in the passageways 151—151 such that they extend from the one end. The other end 149 is brought into juxtaposition with the one end and the extending pins 152—152 caused to be positioned in the passageways 151—151 of the other end. A room temperature vulcanizeable (RTV) material is applied over the joint. The assembly is accomplished to offset the joint between end portions 149—149 of the circumferential gasket 147 and the joint between the portions 42 and 44 of the end plate assembly 30.

Then the longitudinal gaskets 141—141 are mounted in the grooves of the cover 24. Exposed peripheral portions of the end plate assemblies 30—30 are thereby received in the semi-circular flange channels 105—105 of the cover 24. Prior to the assembly of the top cover 23 to the bottom cover 24, the craftsperson applies room temperature vulcanizeable material to each longitudinal gasket 141 adjacent to its intersection with the circumferential gasket. This helps to insure that an air tight seal will be formed at the so-called triple point, that is at each confluence of the covers and an end plate assembly 30.

The sealant material which is used to supplement the seal at the triple point and about the juncture of the ends 149—149 of each circumferential gasket must meet certain requirements. It must of course have a sealing capability. Also, it must have lubricating qualities and it must not create a corrosive environment within the closure. A suitable sealing material is one designated B-sealant and manufactured by the Devcon Company of Danvers, Massachusetts, and the Dow Corning Corporation of Midland, Michigan. It comprises a silicone composition which cures on exposure to the atmosphere.

It should be observed from a study of FIGS. 2, 5 and 6 that the trough 43 transitions from an elliptical shape to one having a relatively narrow rectangular cross-section where it intersects the flange channel 45. This insures contact over a substantial portion of the width of the circumferential gasket 147 and also controls the tendency of the sealing material in the trough 43 to flow outwardly.

The covers 23 and 24 are brought together to enclose the end plate assemblies 30—30 with the longitudinal edge portion 109 of each becoming disposed adjacent to the longitudinal edge portion 111 of the other. Then the craftsperson turns the wire frame 121 on each side of the closure to bring the latching fingers mounted thereon into juxtaposition with the seats 134—134 of the opposing cover (see FIG. 7). Thereafter, each end 128 of each of the latching fingers 126—126 is engaged with a portion 137 of an associated seat and the lever portion 129 of the finger turned about its associated wire fulcrum portion 127 to apply forces to the seat (see FIGS. 9 and 11). As each lever portion 129 passes over the so-called center position, it snap-locks against the other cover to secure itself in position.

As the latching fingers 126—126 are moved over a center bistable position, each of the longitudinal gasket strips 141—141 reforms and fills substantial portions of both of the facing grooves 112 and 113 between the covers 23 and 24 (see FIG. 9). Further, the closing of the covers 23 and 24 causes compressive forces to be applied to the circumferential gaskets. These forces also cause both the circumferential and the longitudinal gaskets to become reconfigured with portions thereof being moved into engagement with each other. As a result, an air tight seal is formed between the circumferential and longitudinal gaskets at the triple point.

Figure 12:
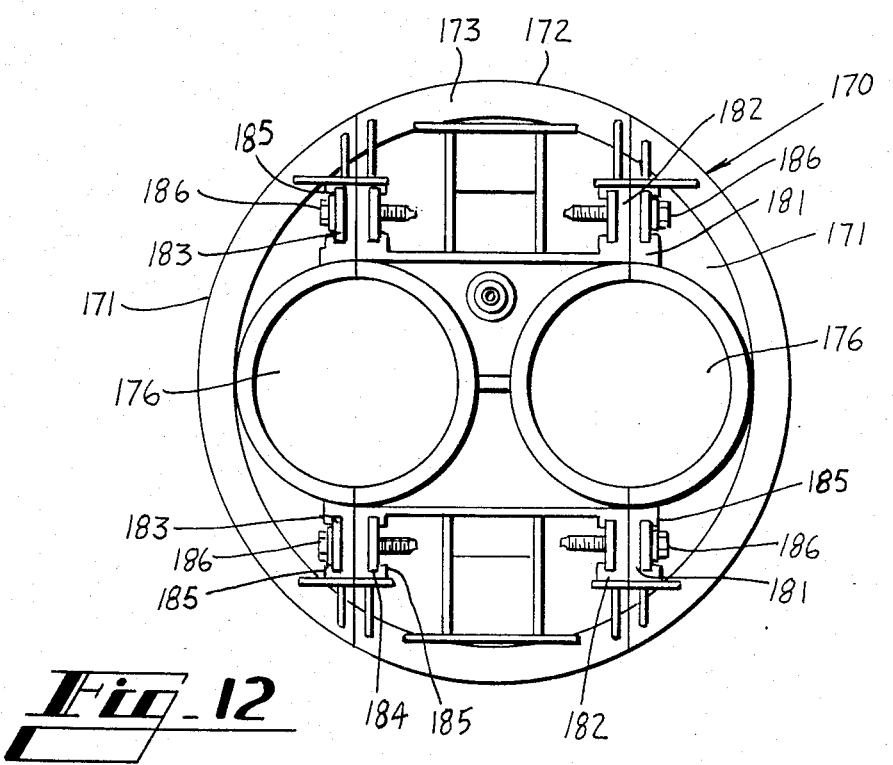
FIG. 12 is an elevational view of an end plate assembly through which two cables extend.

In FIG. 12, there is shown an end plate assembly 170 which accommodates two cables. The end plate assembly 170 comprises identical outer portions 171—171 and a center portion 172. The center portion is provided with nests 173—173 similar to those in the end plate assembly 30 for receiving an alignment bar 74. Further, the center and outer portions 172 and 171—171 cooperate to form two openings 176—176 which are adapted to receive portions of cables which have been wrapped with a sealing tape disposed between retaining washers.

The end plate assembly 170 also includes facilities for securing together the outer portions 171—171 and the center portion 172. As can be seen in FIG. 12, shelves 181—181 are formed in each end section and 182—182 in the center section. When the plastic portions are mated together to form an end plate having an inwardly converging wall, the shelves are aligned. Bearing plates 183 and 184 are received in ways provided by overhanging portions 185—185 and fasteners 186—186 turned through threaded holes in the interior plates. Cable clamps (not shown) are slidably disposed under downturned ends of the bearing plates and engage the cables as did the clamps 77—77 shown in FIG. 2.

In FIG. 13 there is depicted a cable closure 191 which includes the end plate assembly 170 to accommodate two cables 192 and 193. The covers and the cover fastener system are identical to those used for the single cable end plate assembly 30.

Although in the preferred embodiment, a cable extends into the closure 20 through each end plate assembly, other variations are feasible. For example, the closure could be provided with one end plate assembly 30 in which the hub opening is plugged and an end plate assembly 170 through which both cables extend.

It is to be understood that the above-described arrangements are simply illustrative of the invention. Other arrangements may be devised by those skilled in the art which will embody the principles of the invention and fall within the spirit and scope thereof.

What is claimed is:

1. A closure adapted to have at least one cable extend thereinto, said closure comprising:

first and second end plate assemblies being spaced apart and each comprising portions assembled together to form a flanged peripheral portion connected to a wall which converges inwardly toward the interior of said closure and which terminates adjacent to a hub which is offset from the flanged peripheral portion along a longitudinal axis of said closure, each said hub being disposed with said closure and having an opening which is adjacent to have a cable extend therethrough;

first and second covers which are assembled together to engage the flanged portion of each of said end plate assemblies and form a cylindrical housing; and means disposed within said housing and aligned with each said hub in a plane normal to the longitudinal axis for applying balanced forces to each said end plate assembly to secure together said portions thereof and to maintain each said hub having a cable extending therethrough in compliant engagement with a sealing material which is disposed about the cable within the hub opening.

2. The closure of claim 1, wherein each said end plate assembly comprises two substantially identical mating portions.

3. The closure of claim 2, wherein said portions are assembled together with a hub being connected to a small diameter portion of each of said assemblies and with the flanged portion being formed about the large diameter portion of each of said assemblies.

4. The closure of claim 1, wherein each said end plate assembly comprises a center portion and two substantially identical outer portions.

5. The closure of claim 4, wherein said center portion includes two spaced centrally located hub portions each of which is designed to mate with a hub portion of one of the outer portions to form a hub through which a cable may be extended.

6. The closure of claim 1, wherein each said portion of each said end plate assembly includes a hub portion and diametrically opposed shelves extending from said hub portion with each of said shelves having an opening therethrough, said closure also including a bearing plate being disposed in engagement with each of said shelves on each side of said hub portion and having an aperture therein, said apertures of said bearing plates being aligned with said openings in said shelves, and openings in said shelves and aligned apertures of said plates of each said portion being aligned when said portions are assembled.

7. The closure of claim 6, which also includes means connected to said shelves for holding said bearing plates in engagement with said shelves.

8. The closure of claim 7, wherein said means for applying balanced forces includes overhanging means formed integrally with said shelves and overhanging said bearing plates to hold said bearing plates in engagement with said shelves.

9. The closure of claim 7, wherein each of said bearing plates includes overlying portions which cooperate to provide a guideway for receiving slidably a cable clamp.

10. The closure of claim 9, wherein each said clamp has a V-shaped cross-section with a flange extending from each leg of the V-shaped cross-section and wherein said flanges of said clamps are received in said guideways.

11. The closure of claim 10, wherein each said clamp includes teeth along edges of the V-shaped cross-section for engaging a jacket of a cable which extends into said closure to secure the cable within said closure.

12. The closure of claim 11, wherein each leg of each said clamp adjacent to said edges along which said teeth are formed includes a slot and wherein said clamps are held in engagement with the cable by a ring clamp which is passed through said slots in said legs.

13. The closure of claim 1, wherein each said end plate assembly includes mating portions each having a hub portion which has a semi-circular opening such that upon mating of said portions, said semi-circular openings form a circular opening which is adapted to receive a plurality of stacked convolutions of a sealing tape wrapped about a cable extending through the end plate, said sealing tape being retained by spaced washers which are adapted to be received in grooves in walls which form said circular opening.

14. The closure of claim 13, wherein said end plate assembly includes a channel formed peripherally thereabout.

15. The closure of claim 14, wherein said end plate portions at a juncture thereof each includes a trough which connects the channel in the periphery of said end plate assembly and the grooves in said walls which form the circular opening, said troughs of the assembled end plate portions having a cross-section which transitions from a generally oval to a relatively narrow rectangular shape adjacent to said channel.

16. The closure of claim 15, wherein a sealing material is disposed in said channel in said end plate assembly and said troughs in said portions.

17. The closure of claim 1, wherein each portion of each end plate assembly includes a slot formed adjacent to an outer periphery thereof, each said slot designed to receive a downturned end of an alignment bar which extends between said end plate assemblies and which maintains said assemblies spaced apart.

18. The closure of claim 17, wherein each said portion of each said end plate assembly is formed with a well which opens to an exterior surface thereof and which is aligned with said slot of said portion.

* * * * *

UNITED STATES PATENT AND TRADEMARK OFFICE
CERTIFICATE OF CORRECTION

PATENT NO. : 4,538,021

DATED : August 27, 1985

INVENTOR(S) : A. H. Williamson, Jr.

It is certified that error appears in the above-identified patent and that said Letters Patent are hereby corrected as shown below:

In the claims, column 10, claim 1, line 51, "with" should read --within--. Column 10, claim 1, line 52, "adjacent" should read --adapted--.

Signed and Sealed this

Tenth Day of February, 1987

*Attest:*

DONALD J. QUIGG

*Attesting Officer*     *Commissioner of Patents and Trademarks*